3,165,547
PROCESS FOR PREPARING DIPHENIC ACID

Julius Altpeter, Bad Homburg vor der Hohe, and Hubert Sauer, Hofheim, Taunus, Germany, assignors to Rutgerswerke-Aktiengesellschaft, Frankfurt am Main, Germany
No Drawing. Filed July 20, 1959, Ser. No. 828,004
Claims priority, application Germany, July 29, 1958, R 23,783
5 Claims. (Cl. 260—523)

This invention relates to a process for preparing diphenic acid and it has particular relation to the conversion of phenanthrene by oxidation into diphenic acid.

It has been known that 2,2′-diphenic acid is formed by oxidation of phenanthrene and it has also been known that among the conventional methods of oxidation only the oxidation by means of peracetic acid is reasonably feasible. All other oxidation methods either cause an extensive degradation of the phenanthrene molecule or give extremely low yields.

Due to its extremely strong exothermic character, the oxidation of phenanthrene by means of peracetic acid causes considerable difficulties even on a semi-commercial scale, and these difficulties are further increased in operation on full commercial scale. Moreover, handling of the necessary large amounts of peracetic acid is not without danger.

U.S. Patent No. 2,786,076 describes a process for oxidizing phenanthrene with peracetic acid, in which $H_2O_2$ is added to a solution of phenanthrene in acetic acid in order to form the necessary peracetic acid. The reaction is started by the supply of heat and proceeds then with strong evolution of heat.

It has now been found that the above described difficulties can be avoided if the oxidation of phenanthrene to diphenic acid is carried out in the following manner.

The pheneanthrene is dissolved in the acetic acid. To this solution benzene is added and the resulting solution is heated in order to cause the benzene to boil. The necessary amount of $H_2O_2$ (in 35% solution) is then gradually added to the benzene-containing reaction mixture. The water produced is distilled off in the form of an azeotropic mixture with benzene, so that no dilution of the acetic acid takes place. It is thereby possible to operate with a considerably lower amount of acetic acid than in the process described in the above mentioned U.S. patent. According to the latter, for 1 mol of phenanthrene 22 mols of acetic acid are needed, while in the process of the present invention the use of 10 mols of acetic acid for one mol of phenanthrene is sufficient. As acetic acid is the most expensive ingredient in the oxidation process, this reduction of the amount of acetic acid means considerable savings. Moreover, by carrying out the reaction in the here described manner according to the present invention, the danger of sudden decomposition of relatively large amounts of peracetic acid is eliminated.

In carrying out the process of the invention, instead of benzene other liquids can be used which can be distilled with water in the form of azeotropic mixtures and are indifferent to the reactants. As examples of such liquids, alkyl benzenes, e.g., toluene and xylene and particularly nitrobenzene, are mentioned.

After oxidation of the phenanthrene, the reaction mixture can be processed in conventional manner, e.g., by neutralization with sodium hydroxide, or sodium carbonate, filtration and precipitation of the diphenic acid by acidifying the solution.

Economically more advantageous is the separation of diphenic acid by cooling the reaction mixture to ordinary room temperature (e.g., 15°–20° C.), whereby the diphenic acid precipitates in crystalline form and can be separated, e.g., by filtration. The filtered liquid which contains the acetic acid, solvent and small amounts of diphenic acid and phenanthrene, can be used again for oxidation of phenanthrene according to the process of this invention.

Example 1

In a three-necked flask of 6 liters, which is provided with stirrer, esterification attachment and thermometer, as well as a dropping funnel, 1350 parts of acetic acid, 400 parts of phenanthrene and 1680 parts of benzene are introduced and heated in order to cause the benzene to boil. Subsequently 1120 parts of hydrogen peroxide (solution of 35%) are gradually added over a period of 12 hours. The water is continuously distilled off in the form of an azeotropic mixture with benzene. After the reaction is completed, the reaction mixture is neutralized with 810 parts of solid sodium hydroxide, the benzene layer is separated and filtered from undissolved material. The filtrate is acidified with 2700 parts of concentrated hydrochloric acid, whereby 375 parts of diphenic acid having a melting point of 226°–228° C. are obtained, which corresponds to about 70% of the theory.

Example 2

400 parts of pheneanthrene are oxidized in the same manner as described in Example 1, in the presence of 1350 parts of acetic acid, 1680 parts of benzene and 1120 parts of hydrogen peroxide (solution of 35%). After the reaction is completed, the reaction mixture is allowed to cool to ordinary room temperature, whereby 250 parts of diphenic acid separate in crystalline form and are recovered by filtration. The filtrate which still contains—in addition to acetic acid and benzene—150 parts of diphenic acid, can be used again after addition of fresh phenanthrene, and making up for the small losses of benzene and acetic acid, for the reaction with $H_2O_2$. From this charge as well as from subsequent charges in which the same amounts of starting material are used, 400 parts of diphenic acid are recovered, which corresponds to a yield of 73.5% of the theory.

Example 3

In a 6 liter three-necked flask provided with stirrer, column, esterification attachment, thermometer and dropping funnel, 1350 parts of concentrated acetic acid, 400 parts of phenanthrene (of 98%) and 1550 parts of nitrobenzene are heated to about 100° C. Into this mixture 1120 parts of $H_2O_2$ (solution of 35%) are permitted to flow in under stirring during a period of about 3 hours, whereby the water distilling off in the form of an azeotropic mixture is continuously removed and the nitrobenzene is reintroduced into the flask. The sump temperature increases up to the end of the reaction slowly to about 110° C. After subsequent cooling to ordinary room temperature, about 300 parts of diphenic acid precipitate in crystalline form and are recovered by filtration. The filtrate which contains—in addition to acetic acid and nitrobenzene—still about 190 parts of diphenic acid in solution, can be treated again, after addition of fresh phenanthrene and making up for the slight losses of acetic acid and nitrobenzene, with hydrogen peroxide. In this charge as well as in subsequent charges in which the same amounts of starting material are used, 490 parts of diphenic acid are obtained, which corresponds to a yield of 92.3% of the theory. The diphenic acid obtained has a melting point of at least 230° C., without being recrystallized.

Equally high yields are likewise obtained if a phenanthrene of technical purity, e.g., 90%, is used as starting material.

The parts and percents mentioned above are by weight if not otherwise stated.

It will be understood from the above that this invention is not limited to the steps, conditions, proportions and other details specifically described above and can be carried out with various modifications. For example, the amount of acetic acid used may be varied, e.g., in the range of 8 to 12 mols of acetic acid for 1 mol of phenanthrene, the range of 10:1 used in the above examples being preferred. The hydrogen peroxide used in the above examples in a proportion of 5 mols $H_2O_2$ for 1 mol of phenanthrene, gave very satisfactory results, but the amount of $H_2O_2$ may be, of course, also varied, e.g., by using 5% more or less than the proportion of 5:1. In the above examples, to 1750 parts of the solution of phenanthrene in acetic acid, 1680 parts of benzene and 1550 parts of nitrobenzene, respectively, were added and used with very satisfactory results, but it will be appreciated that the amount of solvent may be varied, e.g., by using 5 to 10% more or less solvent than in the above examples. The acetic acid can be used in the form of concentrated acetic acid of, e.g., 95 to 100% and the hydrogen peroxide can be used preferably with a concentration in the range of 30 to 40%. Neutralization and acidification can be carried out in conventional manner, e.g., with solid alkali, or more or less concentrated alkali solution or acid. The precipitated diphenic acid is separated from the solution mechanically, preferably by filtration. In addition to the organic solvents described above, as further examples chlorinated benzenes are mentioned. These and other modifications can be made without departing from the scope of the invention as defined in the appended claims.

What is claimed is:

1. In a process for converting phenanthrene into diphenic acid by oxidation with peracetic acid, in combination the steps of dissolving 1 mol phenanthrene in 8–12 mols concentrated acetic acid, adding to the resulting solution a volatile organic solvent which is indifferent to the ingredients of the mixture and capable of and sufficient for forming an azeotropic mixture with water and heating the mixture thus formed in the temperature range of 80 to 110° C.; gradually adding to the mixture hydrogen peroxide in about the proportion of 5 mols $H_2O_2$ for 1 mol of phenanthrene and continuously removing water from the reaction mixture in the form of an azeotropic mixture by distillation.

2. A method as claimed in claim 1, in which the reaction mixture is cooled after oxidation of the phenanthrene in order to precipitate diphenic acid by crystallization, the precipitated diphenic acid is mechanically separated from the solution and the separated solution is reused for reaction after addition of fresh phenanthrene to the solution.

3. A method as claimed in claim 1, in which the solvent is benzene.

4. A method as claimed in claim 1, in which the solvent is nitrobenzene.

5. A method of producing diphenic acid by oxidation of phenanthrene with peracetic acid, comprising dissolving the phenanthrene in about 8–12 mols of concentrated acetic acid for one mol of phenanthrene; adding to the resulting solution 0.90–0.96 part by weight, ±5 to 10%, for one part by weight of the phenanthrene dissolved in acetic acid, a volatile organic solvent which is indifferent to the ingredients of the mixture and capable of forming an azeotropic mixture with water, under 110° C. and heating the mixture formed under 110° C. to boiling of said volatile organic solvent; gradually adding to the mixture hydrogen peroxide in the proportion of 5 mols of $H_2O_2 \pm 5\%$, for 1 mol of phenanthrene, and continuously removing water from the reaction mixture in the form of an azeotropic mixture by distillation.

References Cited by the Examiner
UNITED STATES PATENTS

| | | | |
|---|---|---|---|
| 2,086,810 | 7/37 | Longwell et al. | 260—624 |
| 2,199,982 | 5/40 | Bright et al. | 260—523 |
| 2,395,010 | 2/46 | Othmer | 202—42 |
| 2,663,735 | 12/53 | Filar et al. | 260—621 |
| 2,691,049 | 10/54 | Thomas | 260—651 |
| 2,698,340 | 12/54 | Metzweiller | 260—475 |
| 2,786,076 | 3/57 | O'Connor et al. | 260—523 |

OTHER REFERENCES

Horsley et al.: Azeotropic Data, p. 9 (1952).
Swern: Chem. Reviews, 45, 7 (August 1949). Copies in Sci. Lib.

LORRAINE A. WEINBERGER, *Acting Primary Examiner.*

LEON ZITVER, CHARLES B. PARKER, *Examiners.*